United States Patent
Arnold

[15] 3,669,223
[45] June 13, 1972

[54] ROPE GRIPPING DEVICE

[72] Inventor: Carter H. Arnold, 317 Rocky Point Road, Palos Verdes Estates, Calif. 90274

[22] Filed: Sept. 4, 1970

[21] Appl. No.: 69,711

[52] U.S. Cl. ............................................188/188, 188/65.4
[51] Int. Cl. .....................................F16d 59/02, B66d 5/16
[58] Field of Search ....................187/89; 188/65.4, 188, 189

[56] References Cited

UNITED STATES PATENTS

| | | | |
|---|---|---|---|
| 1,165,583 | 12/1915 | Farmer | 188/189 |
| 2,931,466 | 4/1960 | Allenbaugh | 188/188 |
| 3,250,348 | 5/1966 | Moyer | 188/188 |

Primary Examiner—Duane A. Reger
Attorney—Gordon Wood

[57] ABSTRACT

A device for gripping a wire rope or the like wherein a pair of opposed jaws are urged longitudinally of the rope and camming means is provided for urging the jaws toward each other into gripping relation with the rope in response to such longitudinal movement. The particular combination of gripping jaws and camming surfaces achieves an optimum gripping effect. In the illustrative form of the invention the device on which the gripping means is used moves along the length of a fixed rope. Means is provided for actuating the gripping jaws when the relative speed between rope and device exceeds a predetermined amount regardless of whether the rope or the device is stationary.

9 Claims, 6 Drawing Figures

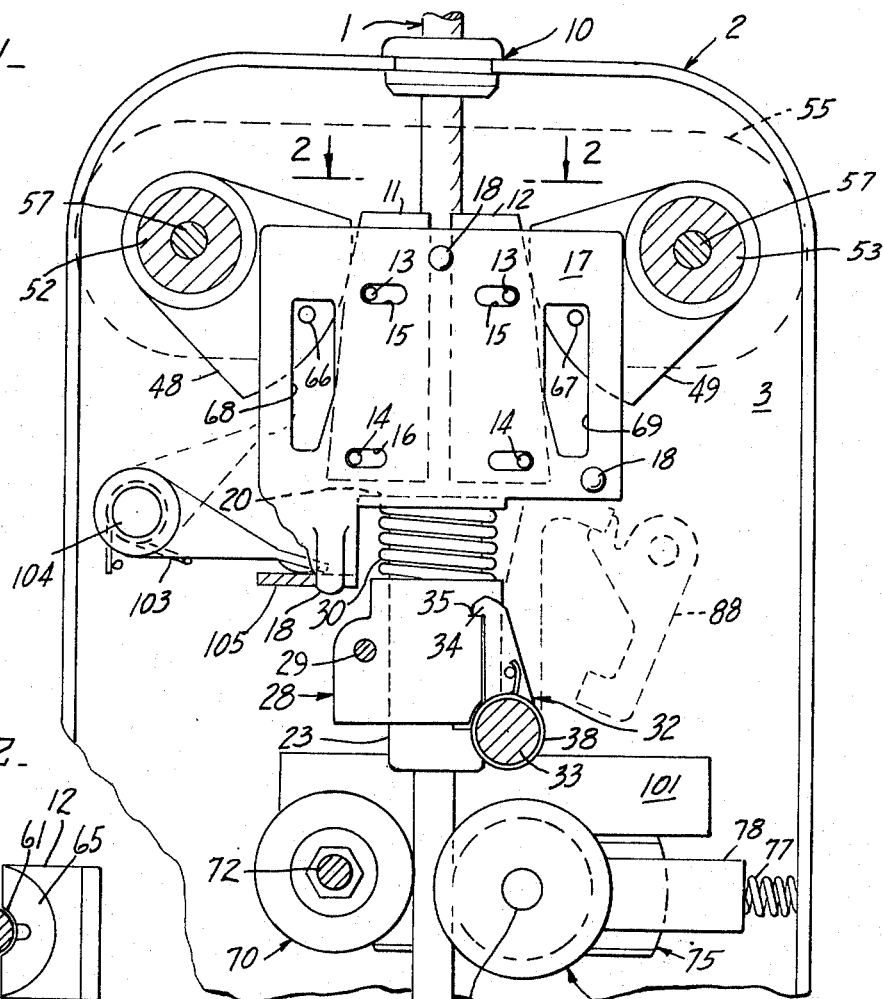
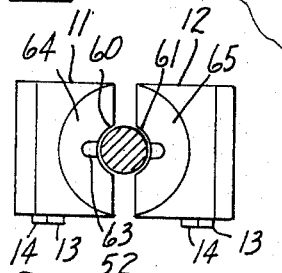
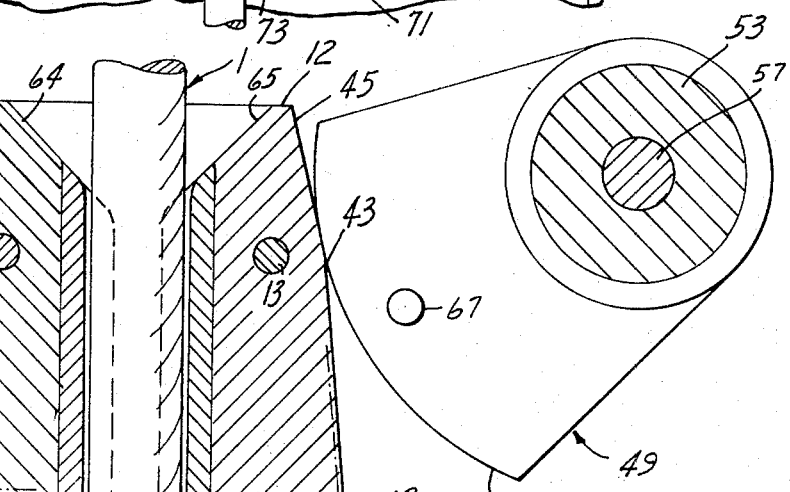

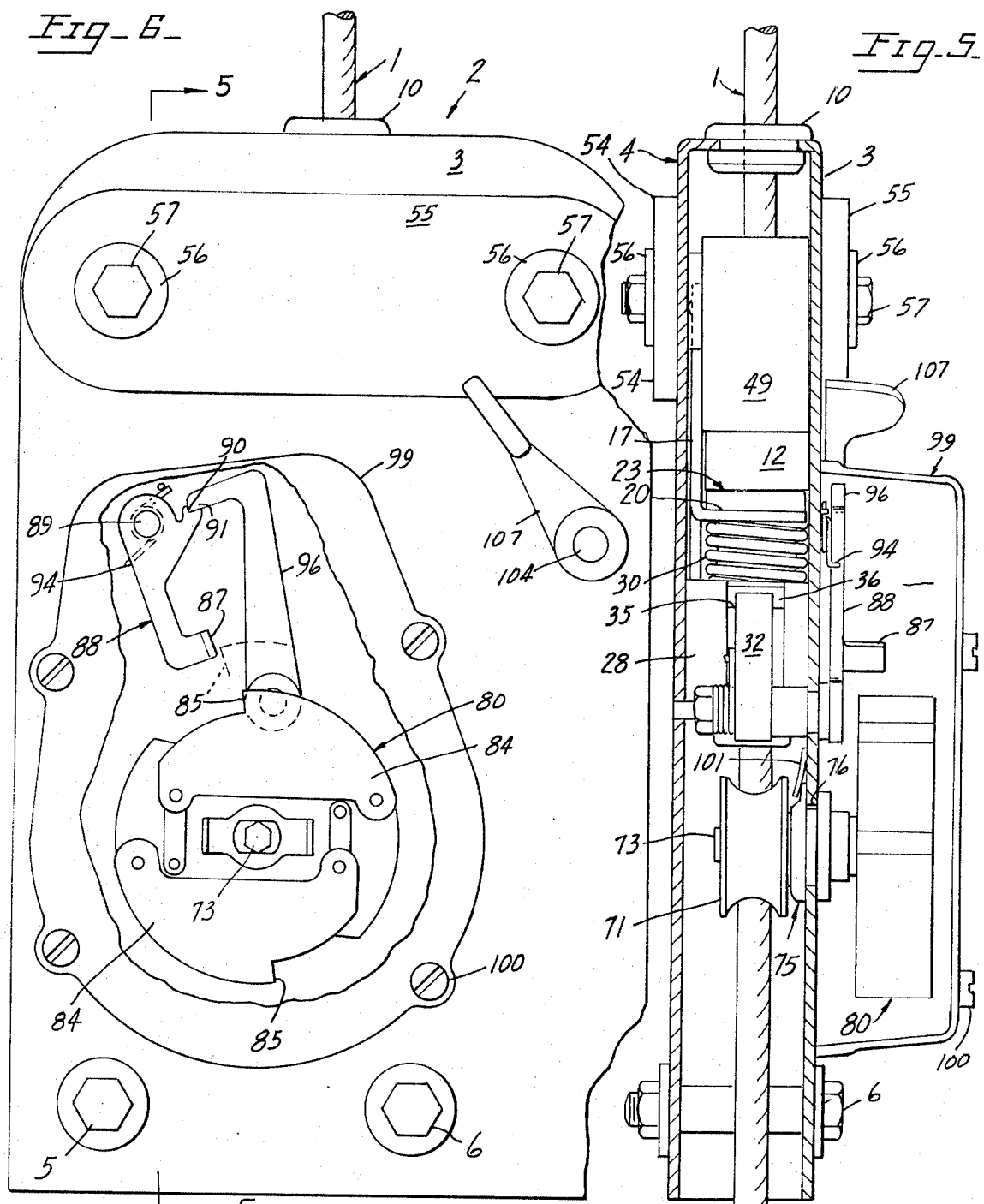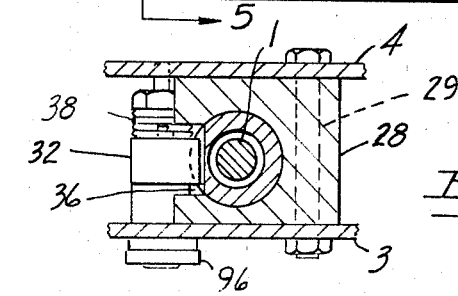

ROPE GRIPPING DEVICE

This invention relates to a device for gripping a wire rope so that such device may be held stationary with respect to the rope.

Heretofore numerous devices have been devised for snubbing or clamping a device with respect to a rope. In many such prior art devices a camming effect is obtained to exert an extremely high transversely directed load on the wire at a point along the length of the latter. In many instances such a concentrated force has the effect of pinching the wire so severely as to cause failure or damaging it to such an extent that it is no longer useful for its intended purpose. Such snubbing devices which provide an intense loading at one point along the length of the rope are therefore not desirable for installations wherein the safety of personnel is involved such as on elevators and other hoisting apparatus.

In order to make a rope gripping device suitable for use in applications wherein the gripping effect is to be achieved without damage to the wire rope it is essential that the rope engaging elements or jaws engage the rope along a sufficient length of the latter so that the gripping force is not so concentrated at one point as to damage the rope. In devices of this nature wherein opposed jaws of sufficient length to obviate damage to the rope are used difficulty has been encountered in obtaining engagement between the jaws and the rope with the jaws substantially parallel to the rope at all times. If this parallelism between jaws and rope is not achieved the disadvantages of the above noted snubbing devices result, that is, if the jaws engage the rope at their corresponding ends instead of along their entire length an undesirable intense concentrated loading on the wire rope results.

The main object of the present invention is the provision of a gripping device for use with a cable, rope, or other elongated cylindrical member which overcomes the disadvantages of prior art devices of like nature.

Another object of the invention is the provision of a rope gripping device which is adapted to be mounted on any object along which the rope traverses. For example, the preferred embodiment of the invention will be described with reference to a safety attachment adapted to be used with hoists of the type shown in U. S. Pat. No. 3,063,653 wherein the hoist travels along the length of a vertically disposed stationary rope. In hoists of this nature it is desirable to provide a foolproof safety device which causes the wire rope to be gripped effectively to prevent further movement of the hoist relative to the rope when the relative speed between rope and hoist exceeds a predetermined safe amount.

Still another object of the invention is the provision of a novel rope gripping assembly including a pair of opposed rope gripping jaws which are brought into rope gripping relationship in such a manner as to prevent concentrated forces being exerted on the rope so as to damage the latter.

Yet another object of the invention is the provision of a rope gripping device which is provided with speed sensing means for actuating the gripping jaws when the relative speed between the rope and the jaws exceeds a predetermined amount. In this connection the invention provides an accurate speed responsive device which is mounted so as to operate effectively even though dirt and other foreign material may be carried by the rope. The invention further provides means for effectively separating the relatively delicate speed sensing unit from the more rugged rope gripping apparatus.

Other objects and advantages will be apparent from the following specification and from the drawings.

FIG. 1 is a fragmentary elevational view of the rope gripping device with the rear housing cover removed to show internal structure.

FIG. 2 is a transverse horizontal sectional view through the rope as taken in a plane indicated by lines 2—2 in FIG. 1 and showing only the rope gripping jaws.

FIG. 3 is a greatly enlarged semischematic view of the rope gripping jaws and the cams associated therewith.

FIG. 4 is a horizontal fragmentary horizontal cross section through the plunger showing the guide and sear therefor.

FIG. 5 is a vertical cross sectional view through the device as taken generally in a plane indicated by lines 5—5 of FIG. 6.

FIG. 6 is a front elevation of the device with portions of the speed sensor housing broken away to show internal structure.

Although the invention may be employed in various situations the advantages accruing from the invention are best illustrated in a hoisting or pulling device wherein a wire rope or the like generally designated 1 is fed through a hoisting or pulling unit to which the invention is secured. For example, the invention may be attached to a hoist of the type shown in U. S. Pat. No. 3,063,653. To this end the invention comprises a housing generally designated 2 comprising front and rear cover plates 3, 4 respectively which may be secured together by suitable bolts. If the device is to be attached to a hoist of the type disclosed in the above patent the hoist may be secured to the device by bolts 5, 6 at the lower end of the housing and to which bolts a suitable connecting member carried by the hoist may be secured. In this sort of installation the wire rope 1 is fixed at its upper end to a suitable structure and the hoist travels along the length of the stationary rope.

On the other hand the invention may be employed on a rope pulling device wherein the rope, wire, or other elongated member is pulled through the device as may be the case in erecting telephone wire for example. In either event it will be apparent that the invention is applicable to situations wherein there is relative movement between the device and the rope and, in most situations, it is desirable to grip the wire rope to fix the same relative to the device when the relative speed of wire rope to the device exceeds a predetermined amount. In addition to providing an effective means for gripping the rope the present invention also includes means for detecting a relative speed between the rope and the device above a predetermined amount and further provides means for actuating the gripping device when excessive relative speed occurs.

The housing 2 is provided at its upper end with a suitable aperture in which is received a ferrule or guide generally designated 10 through which the rope 1 passes. Spaced downwardly from the upper end of the housing 2 are a pair of opposed rope gripping jaws 11, 12. One of the corresponding sides of the jaws 11, 12 slide against the inner side of front cover 3 of housing 2 while the other pair of opposed jaws are provided with upper and lower pins 13, 14 which are received within upper and lower horizontally elongated slots 15, 16 respectively received in a retainer plate 17. This retainer plate is substantially vertically disposed and is provided with a plurality of upset portions such as indicated at 18 to reduce friction between said plates 17 and the inner side of rear cover 4. Adjacent its lower end the retainer plate 17 is provided with a horizontally extending flange 20 which is apertured to receive therethrough the upper end of a plunger 23 which is formed at said upper end with a radial enlargement 24 (FIG. 3) so that the plunger 23 may be passed through a central aperture 25 in the flange 20 so as to assemble the plunger 23 and the retainer plate 17 as best seen in FIG. 3. The plunger 23 is slidably received intermediate its upper and lower ends in a fixed guide generally designated 28 which is secured to the opposite cover plates 3, 4 by means of bolts 29. Interposed between the upper end of fixed guide 28 and the under side of flange 20 of retainer plate 17 is a strong compression spring 30 which acts to urge the retainer plate 17 and the plunger 23 upwardly at all times. However, the jaws 11, 12 and their associated plate 17 and plunger 23 are retained in the lower inoperative position shown in FIGS. 1 and 3 by means of a generally vertically disposed sear 32 which is fixedly secured at its lower end in a shaft 33 and provided at its upper end with a tooth 34 which is adapted to engage a shoulder 35 formed on the sidewall of plunger 23. In order to accommodate this sear 32 in the above mentioned position the guide 28 is provided with a relatively wide slot portion 36 within which the sear 32 is partially received (FIG. 5). The sear 32 is normally urged into holding relation with the plunger 23 by means of a torsion spring 38 surrounding shaft 33.

The means for actuating the sear 32 will subsequently be described, but at this point it will be noted that upon disengagement of the sear 32 from plunger 23 the latter is propelled upwardly under the urgency of spring 30 so as to force the jaws 11, 12 upwardly along the length of rope 1. The outer sides of jaws 11, 12 are provided with camming surfaces 40, 41 (FIG. 3) respectively preferably at an angle of about 5° relative to the rope 1. Said camming surfaces 40, 41 are substantially planar from the lower end of the jaws to points 42, 43 respectively and between said points 42, 43 the outer surfaces of jaws 11, 12 slant inwardly at a more abrupt angle to the rope 1 as best seen in FIG. 3. Such more abrupt angular portions 44, 45 are preferably at an angle of about 15° to the rope 1.

The outer camming surfaces of jaws 11, 12 are engaged by the circular peripheries 46, 47 of a pair of circular cam members generally designated 48, 49 respectively which are swingably mounted on hollow shafts 52, 53 which extend through the cover plates 3, 4 and also through a pair of relatively heavy tension links 54, 55. As best seen in FIG. 5 the ends of hollow shafts 52, 53 are fixedly secured in place by means of washers 56 and bolts 57. The use of tension links 54, 55 is required to resist the extremely high loads developed because of the reaction of shafts 52, 53 to the loading applied on the rope 1.

With reference to FIG. 3 it will be seen that as the spring 30 urges the jaws 11, 12 upwardly and inwardly relative to the rope 1 that extremely large horizontal inwardly directed opposed forces are applied through jaws 11, 12 to the rope 1 to achieve the desired gripping effect. As best seen in FIG. 2 the jaws 11, 12 are provided with opposed arcuate surfaces 60, 61 respectively extending substantially the length of the jaws and formed complementrally to the outer periphery of the rope 1. In order to enhance the gripping effect between the rope and the jaws a recess 63 is formed along the length of surfaces 60, 61 centrally of the same and within said recesses are received inserts of polyurethane plastic which is sufficiently yieldable to provide friction and at the same time sufficiently tough to avoid abrasion. To provide a smooth engagement between the rope 1 and the jaws 11, 12 the latter are formed with conical portions 64, 65 at their upper ends.

Referring to the geometric relationship between the cams 48, 49 and the jaws 11, 12 it will be seen that the upper inclined camming surfaces 44, 45 of said jaws provide clearance for the cams 48, 49 in the normal position of the combination which is that shown in FIG. 3. In said normal position the peripheries 46, 47 of cams 48, 49 engage the jaws at about the points 42, 43 representing the junctures of the differently inclined camming surfaces. Upon upwardly movement of the jaws 11, 12 to the dot dash positions, for example, shown in FIG. 3 it will be apparent that considerable inward movement of said jaws results thereby achieving the desired gripping effect. It will also be apparent that the combination of the plates 17 with its slots 15, 16 and the cooperation of cams 48, 49 results in the jaws 11, 12 undergoing pure translation so that effective gripping between the jaws and the rope is obtained throughout the length of the operative portions of the slots 60, 61 and is not concentrated at a particular point along the length of said jaws. As noted above such concentration of gripping forces, if present, would have the effect of pinching the wire to such a degree that failure of the same might result.

Cams 48, 49 are provided with pins 66, 67 which are received in openings 68, 69 respectively in retainer plate 17. In this manner the jaws 11, 12 and cams 48, 49 are held together as an operative assembly although relative movement between the cams and the jaws is permitted.

Spaced downwardly from the plunger 23 are a pair of wheels 70, 71 respectively between which the rope 1 passes. The wheel 70 is rotatably supported on a fixed shaft 72 carried by rear cover 4. Roller 71 is formed complementrally to the rope 1 at its periphery and is rotatably mounted on a shaft 73 which in turn is carried by a slide assembly 75 slidably mounted in a horizontally extending slot 76 (FIG. 5) formed in front cover 3 (FIG. 5). Slide assembly 75 includes a horizontally extending portion 78 (FIG. 1) and interposed between the outer end of portion 78 and the adjacent sidewall of housing 2 is a compression spring 77 which acts to urge the roller 71 against the rope 1 at all times.

The opposite end of shaft 73 from roller 71 is provided with a speed sensor mechanism 80 which includes a pair of weights 84 (FIG. 6) formed with shoulders 85 and urged to an inner position at all times by means of springs (not shown). The details of speed sensor 80 are not disclosed herein since this centrifugal type speed sensor is conventional and acts on the principle that the faster the rotation of shaft 73 the more the weights 84 move radially outwardly. When the speed of rotation of shaft 73 is sufficiently great to cause the shoulders 85 to move out to the dotted position of FIG. 6 one of said shoulders engages a flange 87 of a trip lever generally designated 88. Said trip lever 88 is swingably mounted on a pin 89 carried by front cover 3 and is formed to provide an abutment 90 which, when heavy spring 30 is in the normal compressed condition, resists the tendency of the outer end 91 of a sear actuating lever 96 to move in a counterclockwise direction (FIG. 6). The tendency of lever 96 to move in a counterclockwise direction is due to the force of spring 30 and the fact that shoulder 35 on plunger 23 is inclined slightly downwardly to the right as seen in FIG. 1. The angle of said shoulder 35, the length of lever 96, and the geometric relationship of levers 88, 96 result in a relatively small force being applied by end 91 of lever 96 against the abutment 90 on trip lever 88. This small force is normally counteracted by a light torsion spring 94 on pivot pin 89 of lever 88 which urges the lever 88 in a counterclockwise direction at all times. However when sensor 80 engages lever 88 the lever 96 is allowed to move in a counterclockwise direction permitting sear 32 (FIG. 1) to disengage from the shoulder 35 of plunger 23 thereby releasing the latter for upward movement under the urgency of spring 30.

One of the important features of the present invention is the isolation of the delicate speed sensor 80 from the more rugged aparatus contained within housing 2. This result is achieved by means of the slide assembly 75 and the fact that the speed sensor 80 moves with the shaft 73 which at all times reflects accurately the speed of the rope 1 relative to the housing 2. This result is attributable also to the fact that the spring 77 (FIG. 1) maintains the roller 71 in engagement with the rope 1 at all times thus reflecting an accurate measurement of the speed of the latter. The speed sensor mechanism may be housed within a housing 99 secured to the front cover 3 of housing 2 by means of suitable bolts 100. It will be noted that this arrangement excludes from the inside of housing 99 any dirt that may be brought into the housing 2 by rope 1. To further insure that no dirt and other foreign material gets into housing 99 a generally rectangular flexible dirt shield 101 (FIGS. 1, 5) may be secured to the inner side of front cover 3 so as to overlap the slide assembly 75 along the upper edge of the latter. By this structure any dirt moving downwardly through the housing 2 is excluded from the delicate apparatus contained in housing 99.

It will also be noted that the above described structure does not encourage the deposits of dirt and other foreign material on the various elements mounted in housing 2. As a matter of fact the design of the jaws 11, 12 and the yieldable supporting of the slide assembly 75 on which roller 71 is mounted not only encourages the foreign material to fall through the housing but does not permit such foreign material to cause an inaccurate reading of the speed of rope 1.

After the condition which causes the jaws 11, 12 to be actuated has been corrected the device may be returned to its normal inoperative position of FIGS. 1 and 3 by means of reset lever 103 (FIG. 1) which is swingably mounted on a shaft 104 rotatable in a suitable opening in cover 3. Said reset lever 103 if formed at its outer end to engage a flange 105 formed on the retainer plate 17. By swinging reset lever 103 in a clockwise direction the retainer plate 17 together with jaws 11, 12 are urged downwardly to the normal position. On the outside of front cover 3 shaft 104 is provided with a handle 107 for so swinging the reset lever 103. (FIG. 6).

Although the invention has been described assuming the device is vertically disposed and cooperating with a vertically extending rope it will be apparent that the housing may be disposed horizontally or at any other angle depending upon the particular function involved.

I claim:

1. In a rope gripping device for use in combination with a length of rope,
   a housing,
   a pair of opposed jaws carried by said housing on opposite sides respectively of said rope,
   said jaws being formed respectively with inner opposed parallel rope engaging surfaces and outer camming surfaces converging in one direction,
   a member swingably supported on a pivot fixedly mounted in said housing outwardly of the outer camming surface of each jaw and adapted to cooperate at its periphery with one of said outer surfaces in rolling engagement therewith,
   said outer surface and said member urging said jaws toward each other and into gripping relation with the rope when said jaws are moved longitudinally of said rope in said one direction.

2. A device according to claim 1 wherein a wheel is provided in peripheral engagement with said rope,
   a mount for rotatably supporting said wheel,
   means for yieldably urging said mount and said wheel toward said rope at all times, and
   a speed responsive device operatively connected to said wheel.

3. A device according to claim 2 wherein a sear is interposed between said speed responsive device and said wheel, said sear being adapted to be released when the speed of said speed responsive device exceeds a predetermined amount.

4. A device according to claim 1 wherein said jaws are each formed at said rope engaging surfaces with a longitudinally extending slot, a plastic material embedded in said slot and adapted at its outer surface to engage said rope to increase traction.

5. A device according to claim 1 wherein the periphery of said member is formed to a circular arc.

6. A device according to claim 5 wherein said camming surfaces are inclined toward said rope in said one direction, a second pair of camming surfaces in continuation of said first mentioned camming surfaces and inclined toward said rope at a greater angle than said first mentioned camming surfaces.

7. A device according to claim 1 wherein continuously acting force means is provided for urging said jaws in said direction,
   holding means for holding said force means inactive to permit relative movement between said jaws and said rope, and means for activating said force means to grip said rope between said jaws,
   said last mentioned means including a sensor for sensing the relative speed between said jaws and said rope for activating said force means when said relative speed exceeds a predetermined amount,
   said sensor including a wheel rotatably supported in said housing and driven by relative movement between said rope and said housing, a speed responsive device rotated by said wheel and cooperatively connected with said holding means for so activating said force means when said speed exceeds a predetermined amount.

8. A device according to claim 7 wherein said speed responsive device is mounted in a compartment laterally spaced from said housing and separate from said wheel to exclude foreign material from said speed responsive device.

9. A device according to claim 5 wherein said camming surfaces are straight and the center of swing of said member is spaced in said direction from the normal point of engagement of said member with said camming surfaces before movement of said jaws into gripping relationship with said rope.

* * * * *